United States Patent [19]
Romell

[11] 3,807,137
[45] Apr. 30, 1974

[54] ELECTROSTATIC GAS-SCRUBBER AND METHOD

[76] Inventor: Dag Romell, 30, Tornavagen, 223 63 Lund, Sweden

[22] Filed: Sept. 30, 1970

[21] Appl. No.: 76,774

[30] Foreign Application Priority Data
Sept. 30, 1969 Sweden............................ 13410/69

[52] U.S. Cl............................ 55/10, 55/11, 55/107, 55/122, 55/135
[51] Int. Cl.............................................. B01d 3/01
[58] Field of Search................ 55/5, 7, 8, 9, 10, 11, 55/107, 122, 135, 136–138, 120

[56] References Cited
UNITED STATES PATENTS

| | | | |
|---|---|---|---|
| 2,024,226 | 12/1935 | Irwin et al. | 55/122 |
| 2,357,354 | 9/1944 | Penney | 55/107 |
| 2,525,347 | 10/1950 | Gilman | 55/10 |
| 3,411,025 | 11/1968 | Marks | 55/107 |
| 3,503,704 | 3/1970 | Marks | 55/8 |
| 1,130,214 | 3/1915 | Steere | 55/11 |
| 1,940,198 | 12/1933 | Wagner | 55/107 |

FOREIGN PATENTS OR APPLICATIONS

| | | | |
|---|---|---|---|
| 629,665 | 10/1961 | Canada | 55/138 |
| 119,236 | 12/1918 | Great Britain | 55/122 |
| 144,701 | 6/1920 | Great Britain | 55/11 |

*Primary Examiner*—Bernard Nozick
*Attorney, Agent, or Firm*—Waters, Roditi, Schwartz and Nissen

[57] ABSTRACT

A method for separating dust from a gas and a gas-scrubber in which droplets of a liquid which is evaporable in the milieu prevailing in the gas are mixed with the gas, and in which the droplets ejected into the gas are electrically charged and are brought to a potential such that the surface charge density of the droplets substantially corresponds to an electric field strength equalling the brakedown field strength of the gas. The droplets thus charged and while carried by the gas are passed with the gas through a gas flow zone in which the droplets are exposed to evaporation, to cause a self-maintained discharge of the electric charge of the droplets due to a tendency of increase of field strength in the vicinity of a droplet as the droplets are diminished during evaporation. Thereby the charges carried by the droplets are transferred to the dust particles carried by the gas and thereafter the gas carrying the particles thus charged and any remaining droplets, are passed through an electric filter for separating the dust particles thus charged from the gas.

3 Claims, 1 Drawing Figure

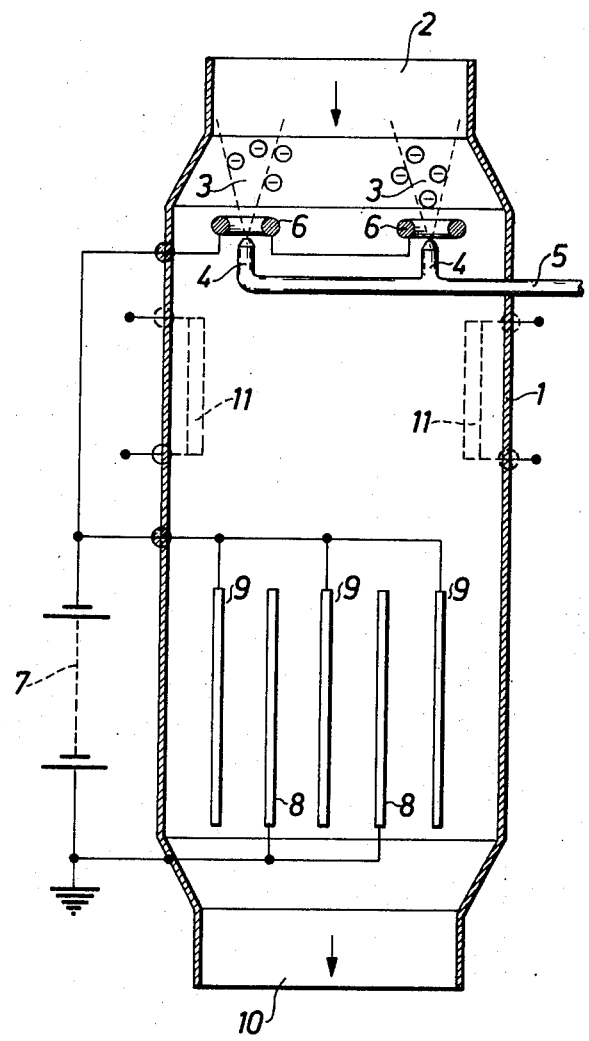

ELECTROSTATIC GAS-SCRUBBER AND METHOD

In the art of removing dust from gases, so-called scrubbers are well-known, in which the gas from which dust is to be separated is brought into intimate contact with a liquid, usually water, while, to enhance the interaction between gas and liquid, the active surface of the liquid is increased by injecting it into the gas flow as jets or curtains in which the liquid is distributed in the form of droplets.

Furthermore, electro-filters are known for precipitating dust from gases, in which the dust particles, after having been charged to high voltage by means of corona discharge, is removed from the gas by aid of electrical forces.

Finally, combinations of scrubbers and electro-filters are known, in which the gas from which dust is to be separated is brought into contact with jets of liquid drops brought to high electric potential.

When purifying hot gases by electro-filters there is often a necessity to lower the temperature of the gases prior to passing the gas through the scrubber or filter, such cooling of the gas being provided for by admixing cold air or by injecting a cooling liquid, mostly water, in form of droplets.

The present invention relates to utilizing injection of liquid droplets into a gas for applying to dust particles carried by the gas an electric charge, to facilitate the separation of the dust particles in a following electro-filter.

When making use of the invention the applying of a charge to the dust particles to be separated differs in so far from the conventional method of applying the charge by means of corona discharge from electrodes held at high potential, as the dust particles carried by the gas are charged by discharge from charged droplets of a liquid following the gas together with the dust particles to be charged, the charge of the droplets being "ejected" from the droplets as they evaporate in the gas while decreasing in size.

The invention can be used also if no demand for cooling the gas is present, although a cooling thereof may be as such be allowable. It can used even for purifying comparatively cold gases, although in a somewhat modified form, in that, for instance, a liquid is heated to a temperature higher than the boiling point thereof at the pressure prevailing in the flow of gas to be purified before ejecting it into the gas and imparted a charge, or by exposing the gas and charged droplets therein to heat in a zone between the place of injection of charged droplets and the following electro-filter.

It is to be emphasized that the injection in accordance with the present invention of charged droplets of a liquid which is evaporable under the prevailing conditions is not to be confused with injection of charged droplets to separate charged dust particles from the gas, in that, when using the invention, dust particles are applied a charge having a polarity corresponding to that of the droplets, the charges of which are transferred to the dust particles, while in a gas-scrubber of the prior art in which charged droplets of a washing liquid are used to catch dust particles, whether applied a charge or not, the droplets of washing liquid and the dust particles are to be given such polarities that attraction forces are present between the droplets and the dust particles.

As a principle, when using the present invention, the droplets of evaporable liquid ejected into the gas are supplied with an electric charge, which, preferably, is so high that the surface charge density of the droplets immediately after charging the droplets corresponds to an electric field strength in the gas adjacent the surface of the droplet equallying or substantially equallying the brakedown field strength. In air of normal pressure, this field strength is about 30 kilovolts per centimeter. Charging the droplets can, as such, be provided for by any conventional means for the purpose, such as for instance by arranging influence electrodes charged to a high potential around nozzles for injecting the evaporable liquid. As is well known per se, the efficiency of the procedure of applying a charge to isolated bodies, in this case the droplets, by influence has a maximum adjacent the brakedown voltage of the medium surrounding the body, the efficiency decreasing for higher voltage of influence electrodes due to corona discharge losses.

When droplets thus charged are then carried with the gas to be purified from dust, as the case may be the hot gas, the liquid evaporates from the surface of the droplets. Thus, the volume of the droplets is successively diminished, the droplets finally possibly entirely disappearing. Due to the fact that the electric surface charge density can not substantially exceed a value for which the field strength adjacent a drop corresponds to the brakedown field strength without a discharge into the surrounding gas, the droplets, while yielding vapor to the surrounding gas, ejects an electrical charge as well, this in form of electrons and/or ions, which provide for a charging of the dust particles present in the gas.

Therewith the total quantity of electricity delivered to the gas can be made very large and, as a consequence thereof, the ionization of the gas be high. In practice, this means that the gas can be passed immediately to the dust collecting section of an electro-filter of any kind known to the art.

Thus, corona discharge electrodes which are normally necessary in electro-filters to charge dust particles carried by the gas by means of ionization of the gas can be omitted, implying advantages for dry as well as for wet electro-filters. In a conventional electro-filter of both types, dust collected in the filter is removed not only from the dust collecting electrodes of the filter, which in filters of the wet type is provided for continuously, but from the ionization electrodes as well, the latter being covered by dust due to the extremely non-uniform fields prevailing in the vicinity of the corona discharge electrodes of the filter and due to induced bipolic charges superceding dust repulsion due to coulomb forces. Such measures are substantially eliminated when utilized the invention.

The necessity in conventional electro-filters to use corona discharge electrodes to provide for the ionization for charging the dust particles sometimes implies a limitation, namely in respect of the highest permissible velocity of the gas when passing the apparatus. The charging of the dust particles in a corona discharge requires a certain time period, and, consequently, the gas velocity must not be so high that the prevailing time of the particles in the corona discharge range does not allow for applying to the particles a charge to a level resulting in a satisfactory precipitation of the dust particles in the following filter proper. This limitation is eliminated in an electro-filter according to the invention.

According to the invention, an electro-filter, whether of the dry type or of the wet type, comprises ionization means consisting of at least one jet of electrically charged droplets of a liquid evaporable under the conditions prevailing in a gas passage extending between the place of injecting the droplets and a following filter device.

In a gas scrubber according to the invention the demand for high voltage electric power is substantially diminished as compared with conventional electro-filters, this due to the fact that influence electrodes to charge the jet of droplets to be evaporated in the gas does not as a general principle, require any current supply at all, only a supply of voltage. The electric energy of and generated in the jet originates from the kinetic energy of the jet, this last mentioned energy in part being transferred into electro-static energy. With a suitable dimensioning and design of means for injecting the jet and electrodes for applying a charge to the droplets, a high efficiency of the energy conversion process is obtainable, a dimensioning which is as such well known to the art.

The section of the gas scrubber in which dust particles are separated from the gas may be of any conceivable design, having, for instance, charged plates, dry or wetted, for collecting the dust, or being of the kind utilizing charged droplets of liquid for collecting the dust particles.

The invention will be more closely described with reference to the sole FIGURE of the accompanying drawing which by way of example schematically illustrates an embodiment thereof.

Numeral 1 illustrates part of a duct for flow of a gas, dust particles of which are to be precipitated, and, also schematically, components of the dust separator of importance for understanding the invention. As such, the components of a device according to the invention individually belong to prior art, wherefore a detailed description thereof will not be necessary for understanding the invention.

Numeral 2 is the inlet port of the apparatus, after which gas entering the apparatus as indicated by an arrow meets jets 3 of droplets of a liquid which is evaporable under the conditions prevailing in the apparatus. The jets are injected into the apparatus by means of nozzles 4 connected to a duct 5 for pressurized liquid. The jets are, as illustrated, injected in a direction opposite to the gas flow, to somewhat increase the prevailing time of the droplets in the gas before the gas then enters a dust separation section of the apparatus. However, the jets may be injected in any direction into the gas provided the droplets are so small that soon after injection they adopt substantially the same velocity through the duct as the gas.

Each nozzle is surrounded by an influence electrode 6 which is, as known per se, arranged relative to the jet of liquid ejected from the nozzle so that the jet when subdivided into droplets is exposed to a concentrated electrostatic field of a strength and polarity depending of the potential of the electrodes 6, said electrodes being connected to a high-voltage source 7, preferably of positive polarity relative to the enclosure of the grounded enclosure of the apparatus. Droplets of liquid ejected from the nozzles 4 then adopt a negative polarity.

Preferably, the potential of electrodes 6 is selected so as to cause no or only insignificant corona discharge from the electrodes, the field strength at the spraying point of the liquid however reaching or only to a small degree deviating from the strength where a corona discharge starts under prevailing conditions. Droplets ejected from the nozzle then acquire the highest possible surface charge, namely, a surface charge density of a magnitude that the gas in the immediate vicinity of the droplets is exposed to an electric field originating from the charge of the droplets in the order of 30 kilo-volts per centimeter, which is the value leading to electric breakdown in normal air of atmospheric pressure.

When the gas to be purified, in most cases in practice a comparatively hot and dry gas, meets the jets of charged droplets, the droplets start evaporating, and evaporate, entirely or in part, while being carried along the duct 1 together with the gas. The electric charge carried by the droplets is then continuously liberated as the radius of the droplets is diminished, the liberated charge appearing in the gas in form of ions and charges landing on dust particles.

The dust particles carried by the gas through the duct then pass collecting electrodes 9 of the electro-filter proper of the apparatus, to which they are attracted, and adhered. Electrodes 8, located between pairs of electrodes 9 and collected to ground provide, together with electrodes 9, for the electric field causing the precipitation of the charged dust particles carried with the gas, as well known per se. As illustrated, electrodes 9 are connected to the same voltage source as the influence electrodes 6. Obviously, electrodes 9 could as well be connected to other voltage source.

Gas purified from dust particles then leaves the apparatus as indicated by the arrow through an outlet port 10 of the apparatus.

The electric power, represented by the surface charge of the evaporating droplets is, in the embodiment of illustrated in the drawing, generated by the flow of liquid by a mechanical charge separation, that is, by converting the kinetic energy of the liquid into electric energy. Under the conditions described, the corresponding transport of charges, expressed in terms of electric current, and under the presumption that the diameter of the droplets of liquid is in the order of a size 0.1 millimeter when leaving the spraying zone, is for a flow of liquid of 1 liter per second of the order of a size of 1.6 mA or $10^{16}$ elementary charges per second, the larger part thereof being available for charging dust particles.

Should an apparatus for precipitating dust from gases be intended for being used for purifying gases which are too cold to cause a substantial evaporation of the liquid forming the droplets, the charge of which is transferred to dust particles in the apparatus, the apparatus itself can, without deviation from the idea of the invention, be provided with means for supplying heat to the droplets to cause evaporation thereof in the range between injection of the droplets and the location of the electro-filter proper in which the dust is removed. Such means are schematically illustrated in the drawing by electric heat radiators 11, electrically connected to a suitable power source, and, as representing an auxiliary equipment necessary under rare circumstances only, shown with dashed lines.

While this invention has been described with respect to specific examples thereof, it should not be construed as being limited thereto. Various modifications and substitutions will be obvious to everyone skilled in the art and can be made without departing from the scope of this invention.

What I claim is:

1. A method of removing dust from a gas in which dust particles to be removed from the gas are supplied with an electric charge before the gas is passed through an electro-filter for removing the dust particles thus charged from the gas, said method comprising applying to said dust particles an electrical charge by the steps including: discharging droplets of a liquid which is evaporable under the conditions prevailing in the gas into the gas at a location upstream of said electro-filter, applying an electrical charge to said droplets of liquid, heating said droplets to effect evaporation thereof in a gas flow passage extending between a location where the droplets have had said electric charge applied thereto and said electro-filter to cause emission of the charges from said droplets, while the droplets evaporate, and transfer of said charges to the dust particles; and thereafter passing the gas through said electro-filter where the thus charged dust particles are removed.

2. An apparatus for removing dust from a gas, said apparatus comprising a duct having an inlet and an outlet, an electro-filter for separating electrically charged dust particles from the gas, said electro-filter being located in said duct, means for applying an electrical charge to the dust particles in said duct carried by the gas, the latter said means being located upstream of said electro-filter and comprising means for injecting droplets of a liquid into the gas, means for applying an electrical charge to said droplets, and means for supplying heat to the droplets in said duct between the location of said means for applying the electrical charge to said droplets and said electro-filter to cause evaporation of said droplets and transfer of the charge to said dust particles before the gas passes into the electro-filter, said means for injecting the droplets of liquid comprising a nozzle facing said inlet for injecting the droplets in counter-current with the supplied gas, said means for applying an electrical charge including an electrode adjacent said nozzle.

3. Apparatus as claimed in claim 2 wherein said means for supplying heat to evaporate the droplets comprises electrical heat radiators disposed in said duct between the nozzle and the electro-filter.

* * * * *